Aug. 31, 1943.   H. DENT   2,328,429
MACHINE FOR FORMING WIRE REINFORCED TAPE
Filed Nov. 10, 1941   4 Sheets-Sheet 1
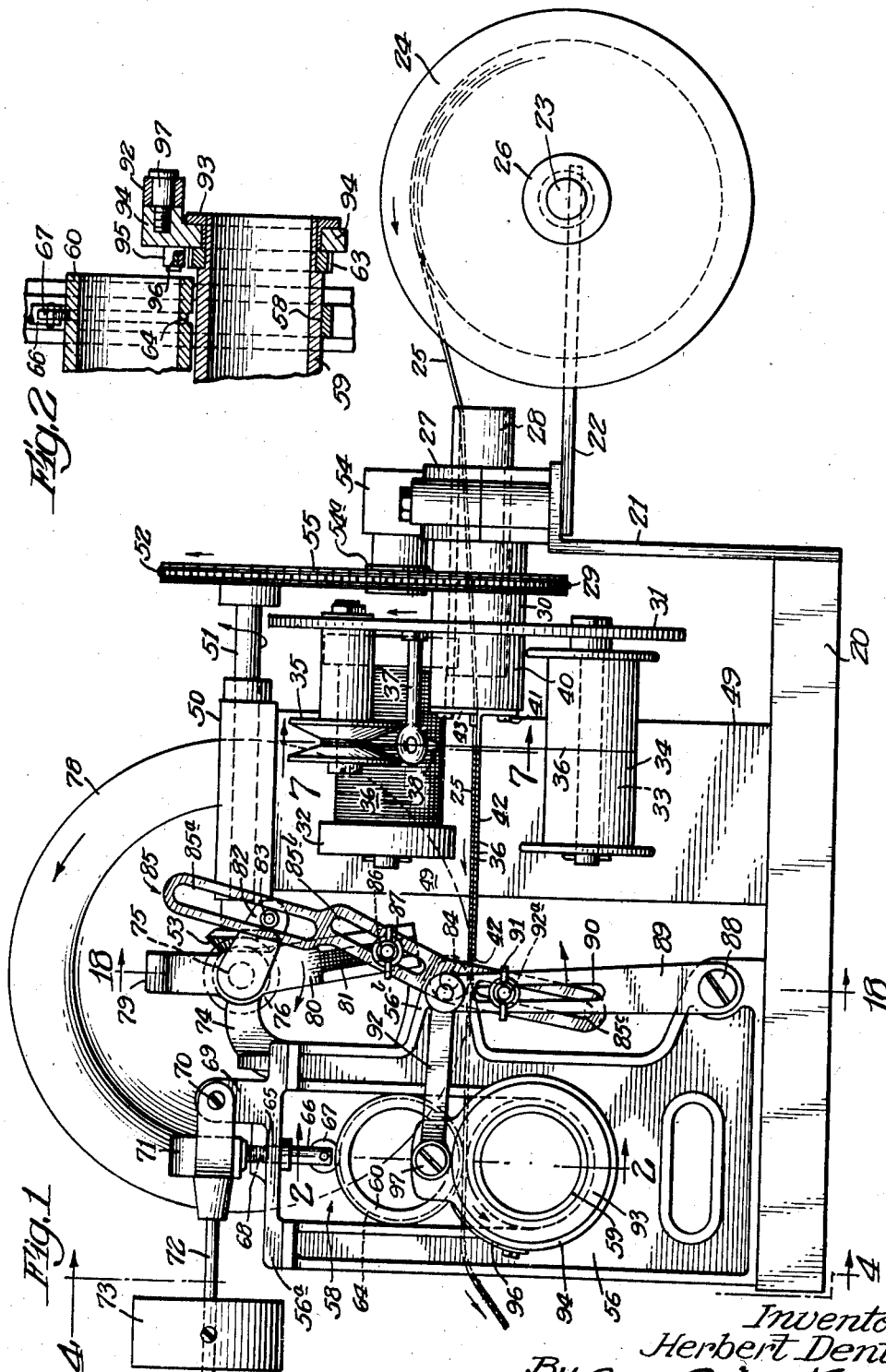
Inventor:
Herbert Dent
By [signature] Atty.

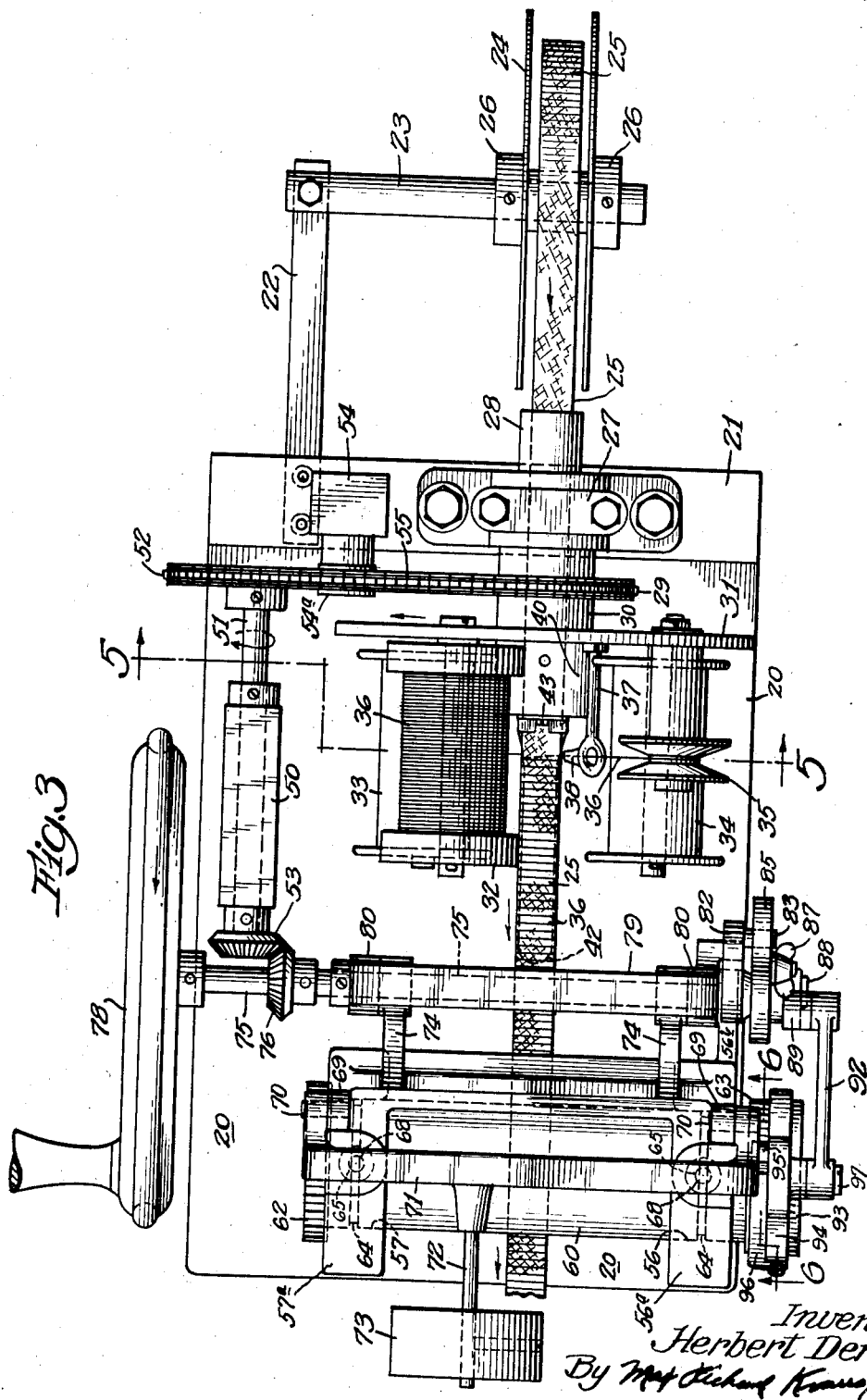

Aug. 31, 1943.  H. DENT  2,328,429
MACHINE FOR FORMING WIRE REINFORCED TAPE
Filed Nov. 10, 1941  4 Sheets-Sheet 3
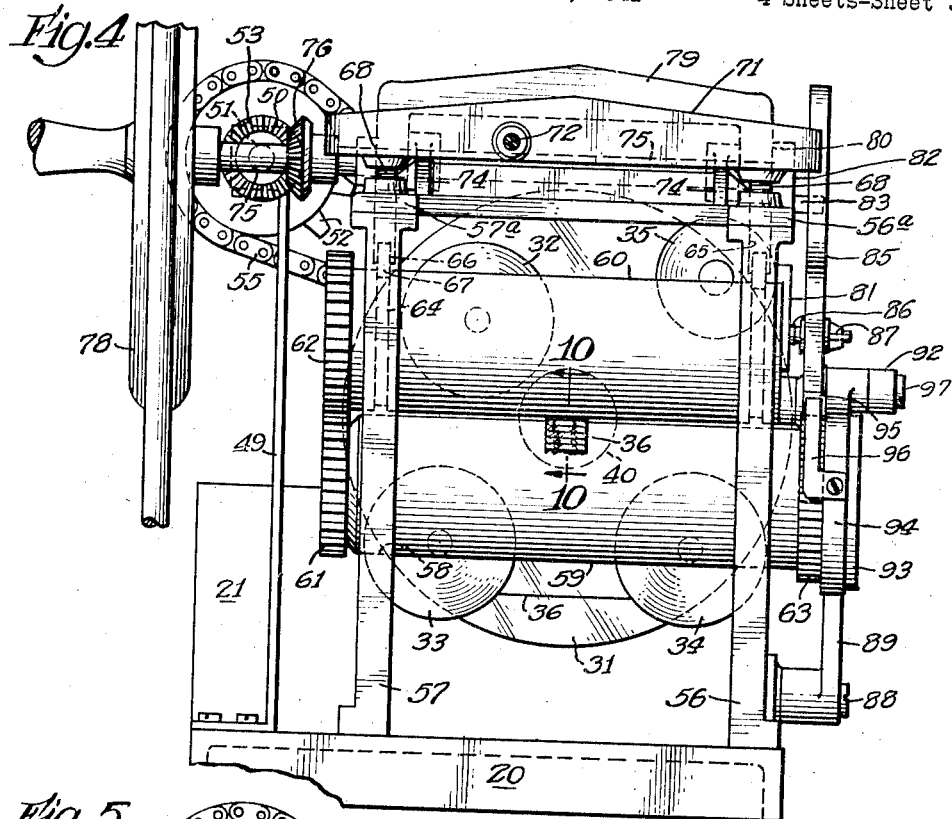
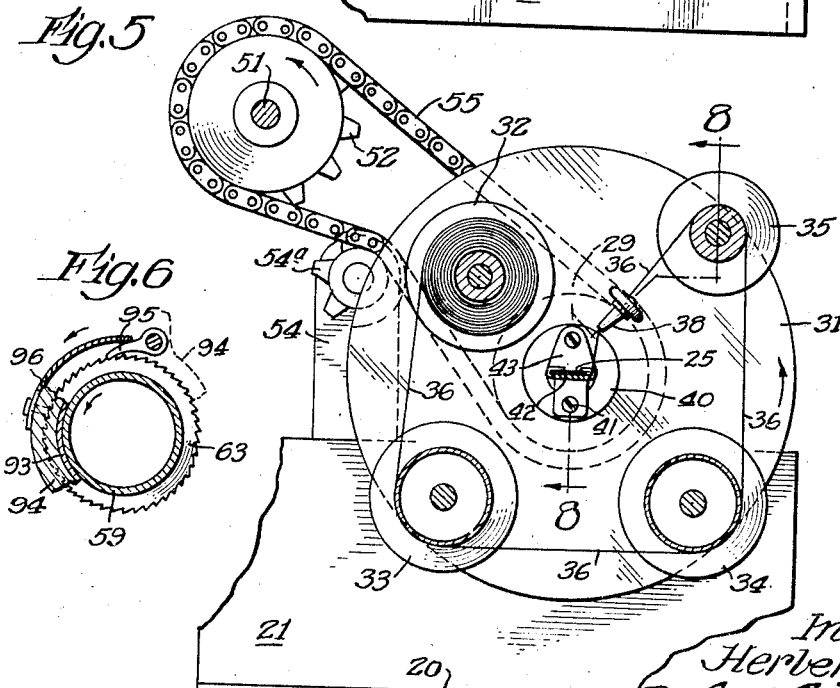
Inventor:
Herbert Dent
By Max Riley Kraus
Atty.

Aug. 31, 1943.     H. DENT     2,328,429
MACHINE FOR FORMING WIRE REINFORCED TAPE
Filed Nov. 10, 1941     4 Sheets-Sheet 4
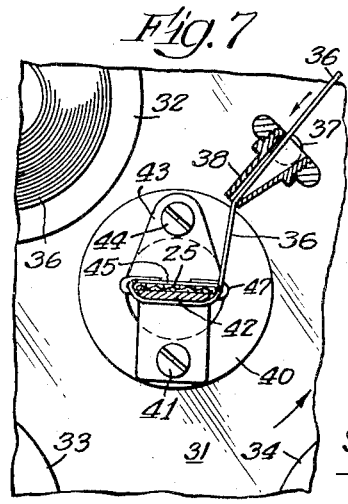
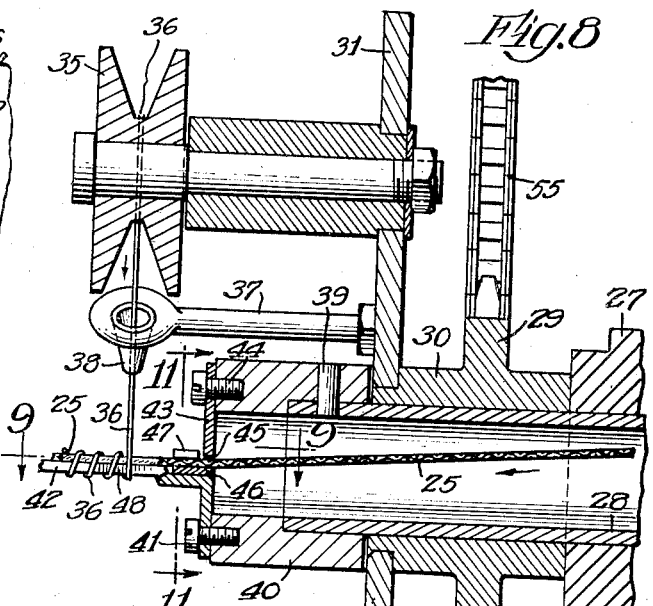
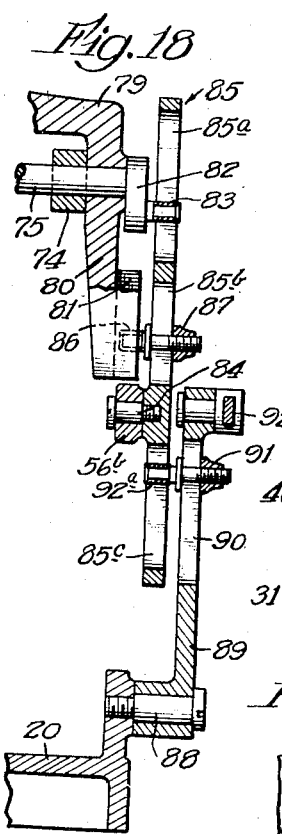
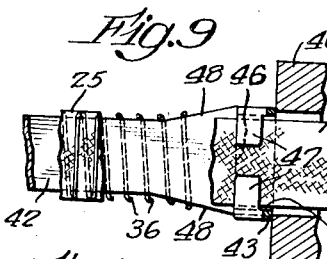
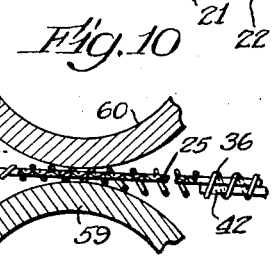
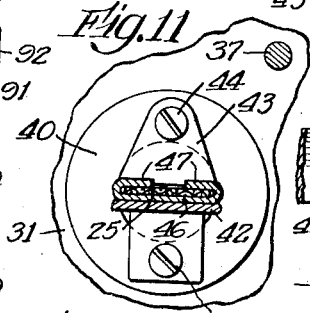
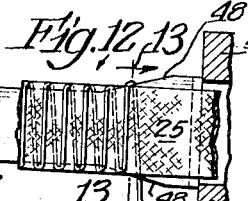
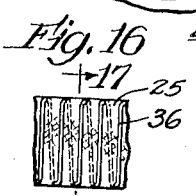
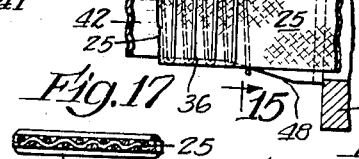
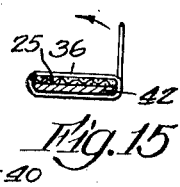

Patented Aug. 31, 1943

2,328,429

UNITED STATES PATENT OFFICE 2,328,429

MACHINE FOR FORMING WIRE REINFORCED TAPE

Herbert Dent, Chicago, Ill.

Application November 10, 1941, Serial No. 418,524

6 Claims. (Cl. 57—3)

This invention relates to a method and machine for forming wire reinforced tape.

One of the objects of the present invention is to provide a machine for manufacturing wire reinforced tape, which machine is automatic, simple and inexpensive to construct and operate and which will speedily and economically produce wire reinforced tape.

Another object is to provide a simple and inexpensive method for forming reinforced wire tape.

Another object is the production of wire reinforced tape of the character shown in my copending application S. N. 385,587, filed March 28, 1941, for the purposes therein set forth.

Other and further objects and advantages of this invention will be apparent to those skilled in the art upon an understanding of the embodiment as set forth in the accompanying drawings and specification.

In the drawings:

Fig. 1 is a side elevational view of the machine.

Fig. 2 is a sectional view with parts broken away taken on line 2—2 of Fig. 1.

Fig. 3 is a top plan view of the machine.

Fig. 4 is a view taken on lines 4—4 of Fig. 1.

Fig. 5 is a sectional view with parts broken away taken on line 5—5 of Fig. 3.

Fig. 6 is a sectional view taken on line 6—6 of Fig. 3.

Fig. 7 is an enlarged sectional view taken on line 7—7 of Fig. 1.

Fig. 8 is an enlarged sectional view taken on line 8—8 of Fig. 5.

Fig. 9 is a plan view taken on line 9—9 of Fig. 8, with a portion of the tape omitted.

Fig. 10 is an enlarged sectional view taken on line 10—10 of Fig. 4.

Fig. 11 is a sectional view taken on line 11—11 of Fig. 8.

Fig. 12 is a plan view similar to Fig. 9 showing the initial portions of the wire when the tape starts advancing.

Fig. 13 is a sectional view taken on line 13—13 of Fig. 12.

Fig. 14 is a view similar to Fig. 12 showing the position of the wire when the tape has ceased advancing.

Fig. 15 is a sectional view taken on line 15—15 of Fig. 14.

Fig. 16 is a view of the finished tape as taken on line 16—16 of Fig. 10.

Fig. 17 is an enlarged sectional view taken on line 17—17 of Fig. 16, and

Fig. 18 is a sectional view with parts broken away substantially taken on line 18—18 of Fig. 1.

The base 20 has mounted to the rear thereof (Figs. 1 and 3) an L-shaped upright 21, to the horizontal portion of which is secured a rearwardly extending arm 22 which supports a spindle member 23. Loosely rotatable on the member 23 is a spool 24 on which is wound the tape 25. The spool rotates between two collars 26, one of which is readily removable for permitting the spool to be mounted on and removed from the member 23.

The horizontal portion of the upright also supports a bearing block 27 (Figs. 1, 3 and 8) which in turn rigidly supports a tube 28. Rotatably mounted on the tube 28 is a sprocket 29 having a hub 30. Permanently secured to the hub to rotate therewith is a disc 31. Mounted on said disc by means of suitable bolts and nuts is the bobbin 32, and the idlers 33, 34 and guide roller 35. The bobbin, idlers and rollers are freely rotatable and are spaced as shown in Fig. 5. The wire 36 from the bobbin passing around the idlers 33 and 34 and around the V-shaped guide roller 35 (Fig. 8). Rigidly mounted on the disc 31 is an eye bolt 37 which has a short tubular extension 38 through which the wire passes coming from the guide roller 35. It will be noted that the base of the groove of the roller 35 is always in alignment with the eye tube.

Rigidly secured on the end of the tube 28 by a pin 39 is a collar 40. Secured to said collar by a screw 41 is the forming member generally indicated at 42. A plate 43 is suitably secured as by a screw 44 to the outer portion of the collar 40. Said plate has a transverse slot 45 and a forwardly extending lip 46. The lip has a pair of inturned fingers 47. The forming member adjacent the lip 46 is depressed so that the lip can nest thereon and the surface of the lip will be flush with the surface of the forming member.

It will be seen that the portion of the forming member from adjacent the lip converges inwardly as at 48 to the narrower parallel portions and that the forming member through the major portion of its length is narrower than the width of the tape which rests thereon. Also anchored to the base 20 is an upright 49 on which is mounted a bearing block 50 which rotatably supports a shaft 51 (Figs. 1 and 3). To one end of the shaft is rigidly secured a sprocket 52 and to the other end of the shaft is rigidly secured a mitre gear 53.

Supported on the horizontal portion of the upright 21 is an upright 54 (Fig. 5) which rotatably supports an idler sprocket 54a. A sprocket chain 55 connects the sprockets 52 and 29 and passes around said idler so that any slackness in the chain may be taken up.

Supported on the forward portion of the base are a pair of standards 56 and 57 (Figs. 1 and 4) each of which is shaped to provide enlarged vertical U shaped openings 58. Resting within said openings are the ends of the metal pressure rollers 59 and 60. The ends of the bottom roller 59 rest on the bottom semi-circular surface of the opening and the roller 60 rests on the roller 59. Mounted on the ends of the rollers 59 and 60 exteriorally of the standard are gears 61 and 62 which are constantly in mesh. The roller 59 has mounted on the opposite end thereof exteriorly of the standard a ratchet 63 (Fig. 6) to be engaged by a pawl presently to be described. The roller 60 is provided in the surface adjacent the ends thereof with annular grooves 64 (Fig. 2). The standards each have removable top portions 56a and 57a (Fig. 1), each provided with a vertical opening 65 which receives a stem 66 on which is rotatably mounted a wheel 67 which rides in the groove 64 of the roller 60. A spring 68 rests on the top of the stem 66. The top portion 56a and 57a each have an upstanding ear 69 to which is rockably secured as at 70 a cross member 71, which supports to the front thereof as by a stem 72 an adjustable weight 73. The cross member 71 rests on the springs 68 to depress same and maintain the wheels 67 under pressure, which in turn will keep the rollers 59 and 60 under pressure.

Extending upwardly and rearwardly of the top portion of the standards are arms 74 which rotatably support a shaft 75, on which is fixedly mounted a mitre gear 76 and a pulley 78. The mitre gears 76 and 53 are in constant mesh.

Also rockably mounted on the shaft 75 is a U shaped member 79 whose depending legs 80 are exteriorly of the arm 74. One of said legs is provided with a slotted portion 81 (Fig. 18). Fixedly mounted on the end of the shaft 75 is a crank arm 82, (Figs. 1 and 18) which carries a rotatable crank pin 83 which engages a lever to be described. The standard 56 has a rearwardly extending portion 56b which pivotally supports as at 84 a lever generally indicated at 85. The lever is best seen in Figs. 1 and 18, and comprises 3 slotted sections 85a, b and c. With every complete rotation of the crank arm 82 the crank pin 83 moves the complete length of the slotted portion 85a. The roller pin 86 which is securely fastened to the lever as at 87 by a wing nut engages the groove 81 and as the lever 85 moves by the actuation of the crank arm 82, the U member 79 rocks back and forth about the shaft 75. The member 79 acts to counterbalance the oscillating members.

Pivotally secured as at 88 to the bottom of the standard 56 is a lever 89 which has a slotted portion 90 in which is securely mounted as at 91 a rotatable pin 92a which is received within the slot 85c so that as said lever 85 is rocked about its pivot 84 it will simultaneously rock the lever 89 back and forth.

Press fitted on the end of the bottom roller 59 is a flanged collar 93 (Figs. 2 and 6), about which a ring 94 freely moves. The ring carries a pawl 95 which engages the ratchet 63. The pawl is urged downwardly by a leaf spring 96 which is secured to the ring 94. Secured to the lever 89 is a link 92, the other end of said link being secured as at 97 to the ring 94.

The operation of the machine will now be described.

In the first instance the tape 25 from the reel 24 is passed through tube 28, through the slotted opening 45, between the fingers 47 and on the forming member 42, until the tape is brought between the rollers 59 and 60 and engaged thereby. The crank handle on the pulley permits the rollers to be slowly rotated for the first insertion of the tape. The tape will lie flat on the forming member and it will be noted that the forming member extends short of the rollers.

As the pulley 78 is driven by a suitable motor, not shown, the shaft 75 will rotate, to operate the mitre gears 76 and 53 to rotate the shaft 51, sprocket 52, chain 55, and sprocket 29. Both said sprockets are of equal diameter. Rotation of sprocket 29 will rotate with it the disc 31 in a clockwise direction viewed from the rear of the machine or counterclockwise as viewed from the front or in Fig. 5. As the disc rotates it carries with it the bobbin 32 on which the wire 36 is wound. As the bobbin moves or rotates with the disc about the forming member and tape as an axis, the wire will unwind from the bobbin 32 (Fig. 5) and pass around the idlers 33, 34 and guide roller 35 through the tubular extension 38 of the eyelet and wind around the tape and the tapered portion of the former 42 close to the point where the tapered portion meets the narrower parallel portion (Fig. 3). As this action takes place the tape must naturally be advanced at the right time to present a new tape surface for winding. Therefore the rotation of the shaft 75, will cause the crank arm 82 to be rotated with the pin 83, moving the slot 85a of the lever 85. As the lever is pivoted at 84 it will rock back and forth about said pivot as the crank arm continues to rotate. The lever 85 thus rocking, will simultaneously through the engagement of the pin roller 86 with the slotted portion of the member 80 cause the U shaped member 79 to rock back and forth about the shaft 75 as a pivot. This serves to counterbalance the oscillating members.

At the same time the lever 85 through the connection between the slot 85c and pin 92a with lever 89 will cause said arm lever 89 to rock back and forth about its pivot 88. Rocking of the lever 89 will move with it the link 92, which moves with it the ring 94 carrying the pawl 95. In the forward movement of the pawl or counterclockwise as viewed in the drawings it will engage the ratchet teeth and rotate the lower pressure roller 59 in a counterclockwise direction. Since the pressure rollers are geared to each other by the gears 61 and 62, the upper roller will be simultaneously rotated clockwise and will cause the tape to be advanced forwardly. As the tape with the wire coiled thereabout passes between the rollers (Fig. 10) the wire will be caused to be compressed closer to the tape and the ends will cut into the side edges of the tape.

On the return stroke of the link 92, the pawl 95 will override the ratchet 63 and during said period the rollers will remain stationary.

The timing between the advance of the tape and the winding operation is synchronized so that with every complete revolution of the shaft 75 and crank arm 82 the disc 31 makes a complete revolution.

The period in the winding operation that the tape is advanced can best be illustrated by reference to Figures 13 and 15. After the wire has been coiled over the surface of the tape and is approximately at the angle shown in Fig. 13, the pressure rollers will then start rotation to advance the tape and such advance will continue until the wire is moved counterclockwise from the Fig. 13 position to the position shown in Fig. 15 thus a new tape surface will be presented. Also beginning with the position of the wire in Fig. 15 the pressure rollers will cease operating and remain stationary during the period that the wire is wound over the top of the tape and again brought to the position approximately that shown in Fig. 13. During such period the tape will remain stationary on the former. Thus an intermittent action is produced whereby the tape is advanced during a portion of the winding of the wire and remains stationary during the remainder of the winding. While the tape is moved intermittently it is understood that the disc carrying the wire is constantly rotating.

To effect an adjustment for adjusting the advance or feed of the tape, the pin 92a is moved up or down in the slot 90 of the lever 89. Lowering the pin 92a will produce a bigger stroke and increase the spacing between each coil or winding on the tape. I have found that 30 gauge soft steel wire is best and the tape can be a ¾ inch width bias cloth tape. If heavier wire is used then the spacings between the coils or windings should be increased.

It will be seen that the wire is wound around the tape on the tapered portion of the forming member 42 and that as the tape is advanced, the wire will slide very easily from the tapered portion. Since the tape is wider than the forming member after it leaves the tapered portion, the wire will imbed or indent itself in the edges of the tape, which will become more pronounced after the wire has been compressed between the pressure rollers.

The operation of the machine is automatic and continuous and after the machine is initially started it does not require the attention of an operator except to supply additional wire and tape.

Various changes and modifications will be apparent to those skilled in the art upon an understanding of this invention which has been set forth herein for purposes of exemplification and all such changes and modifications coming within the scope of the invention are intended to be included within the scope of the appended claims.

I claim:

1. In a machine of the character described including a forming member on which a cloth tape rests, a plurality of rollers intermittently operated for intermittently advancing said tape, a member carrying a flexible wire, said member rotatable about said forming member and tape and adapted to continuously loop said wire about said tape as said tape is intermittently advanced, said rollers additionally compressing said wire about said tape to cause said wire to be imbedded in the edges of the cloth tape.

2. In a machine of the character described including a forming member on which a cloth tape rests, a pair of rollers engaging said tape, a member carrying a flexible wire, said member being rotatable about said forming member and tape and means for intermittently advancing said tape and continuously rotating said wire about said tape.

3. In a machine of thte character described including a forming member on which a cloth tape rests, a pair of rollers engaging said tape, a member carrying a flexible wire, said member being rotatable about said forming member and tape, means for intermittently rotating said rollers and continuously rotating said flexible wire about said forming member and tape to cause said tape to advance intermittently and form a continuous spaced loop about said tape.

4. In a machine of the character described including a rotatable member carrying a soft flexible reinforcing wire, means for advancing a cloth tape during a portion of the rotation of the rotatable member to present a new surface to be wound, and means for arresting the advance of said tape during the remainder of the rotation of the rotatable member.

5. In a machine of the character described including a rotatable member carrying a soft flexible reinforcing wire, means for advancing a cloth tape during a portion of the rotation of the rotatable member to present a new surface to be wound, means for arresting the advance of said tape during the remainder of the rotation of the rotatable member, and means for compressing the wire about said tape to cause said wire to be imbedded in the edges of the cloth tape.

6. In a machine of the character described including a forming member on which a cloth tape rests, said forming member being narrower than the tape, a plurality of rollers intermittently operated for intermittently advancing said tape, a member carrying a flexible wire, said member rotatable about said forming member and tape and adapted to continuously loop said wire about said tape as said tape is intermittently advanced, said rollers additionally compressing said wire about said tape after said tape has left said forming member to cause said wire to be imbedded in the edges of the tape.

HERBERT DENT.